United States Patent
Bauchot et al.

(10) Patent No.: US 8,539,532 B2
(45) Date of Patent: Sep. 17, 2013

(54) RETRANSMISSION MANAGER AND METHOD OF MANAGING RETRANSMISSION

(75) Inventors: Frederic Bauchot, Saint-Jeannet (FR); Francois-Xavier Drouet, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/247,280

(22) Filed: Oct. 8, 2008

(65) Prior Publication Data

US 2009/0138776 A1    May 28, 2009

(30) Foreign Application Priority Data

Nov. 23, 2007   (EP) ..................................... 07301576

(51) Int. Cl.
   *H04N 7/16*   (2011.01)
(52) U.S. Cl.
   USPC ............ 725/62; 714/748; 370/235; 370/252; 370/462
(58) Field of Classification Search
   USPC . 725/62, 69, 89, 134, 142; 455/414.1–414.4, 455/418, 453, 432.3, 466, 574, 550.1, 536.2, 455/560–561; 370/250, 252, 419, 462, 486; 714/746–754, 760–766, 774–780, 788–791, 714/798, 820–821
   See application file for complete search history.

(56) References Cited

U.S. PATENT DOCUMENTS

| | | | |
|---|---|---|---|
| 2003/0009594 A1* | 1/2003 | McElligott | 709/245 |
| 2003/0103459 A1* | 6/2003 | Connors et al. | 370/235 |
| 2004/0160979 A1* | 8/2004 | Pepin et al. | 370/462 |
| 2005/0089043 A1* | 4/2005 | Seckin et al. | 370/395.21 |
| 2006/0128424 A1* | 6/2006 | Rooyen | 455/552.1 |
| 2007/0038922 A1* | 2/2007 | Kim et al. | 714/776 |
| 2007/0053303 A1* | 3/2007 | Kryuchkov | 370/250 |
| 2007/0223535 A1* | 9/2007 | Hamazaki | 370/486 |
| 2010/0008364 A1* | 1/2010 | Andre et al. | 370/392 |

* cited by examiner

*Primary Examiner* — Brian Pendleton
*Assistant Examiner* — Alan Luong
(74) *Attorney, Agent, or Firm* — Douglas A. Lashmit; Hoffman Warnick LLC

(57) ABSTRACT

The invention provides a retransmission manager for use in a digital content delivery system, wherein the delivery system comprises a plurality of user devices, a set of content providers for delivering digital content to the user devices in the form of bursts of content through a source unit. The retransmission manager is connected to the user devices to receive notifications therefrom, each notification received from a given user device identifying a burst received by the given user device which is candidate for retransmission. The retransmission manager selects a set of bursts among the bursts identified by the notifications based on the amount of available bandwidth at the source unit and on negotiation messages received from at least one of the plurality of content providers, the negotiation message being related to at least one burst identified in the notifications and including, for each burst, a negotiation parameter. The retransmission manager then sends a request for retransmission of the selected bursts to the source unit.

21 Claims, 15 Drawing Sheets

RETRANSMISSION MANAGER AND METHOD OF MANAGING RETRANSMISSION

FIELD OF THE INVENTION

The invention generally relates to a retransmission manager and a method of managing retransmission of digital content.

BACKGROUND ART

In digital content delivery systems, the multimedia content is broadcasted to user devices by a broadcasting unit through communication channels. The broadcasting unit is connected to a plurality of content providers that provide their actual digital content to the user devices. The content providers may include for instance television and/or digital television service providers.

During transmission of the signals from the broadcasting unit to the end user devices, errors might appear in the multimedia content due to bad conditions in the transmission channels, and consequently the user might receive corrupted content.

Existing systems are known that allow retransmission of the erroneous data, thereby ensuring that all the data will be received by the user devices. However, as the bandwidth available at the broadcasting unit level is a spare and scarce resource, there is a need for a system and a method that allow optimization of the bandwidth for data retransmission.

SUMMARY OF THE INVENTION

The present invention is directed to a retransmission manager and a method and system for managing retransmission of digital content.

The invention allows bandwidth negotiation between the broadcasting unit and the content providers. The invention also allows an optimized use of available bandwidth for retransmission of corrupted video containers.

According to the invention, all the content providers can have visibility on the containers that require retransmission in the whole network. Further, each content provider is kept informed of the negotiation sessions started with other content providers, thereby being in position to participate in the negotiation sessions.

The invention further provides management of corrupted data and management of negotiation information in a centralized manner at the retransmission manager level.

The invention also allows selection of corrupted data as candidate for retransmission at the retransmission manager level based on video container information maintained by the retransmission manager and on negotiation information received from one or more content providers.

The system according to the invention may further take into account various conditions such as the overall number of corrupted data for selecting the candidates for retransmission.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

FIG. 6B illustrates an exemplary container table, according to the invention.

DETAILED DESCRIPTION

Figure 1:
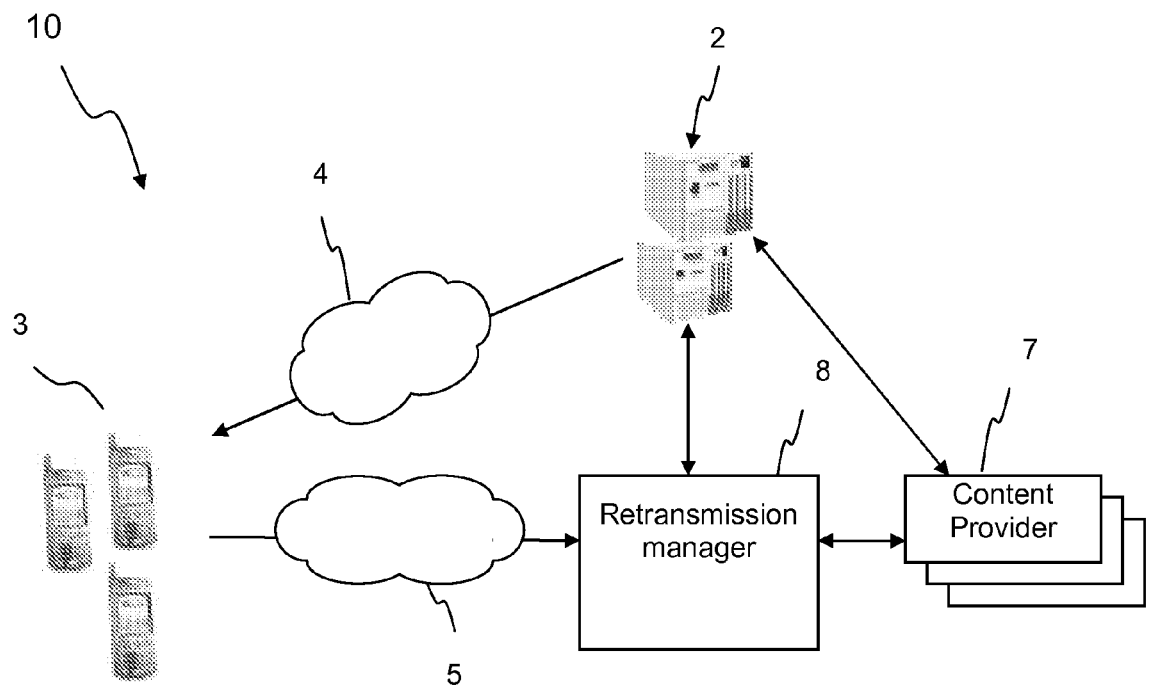
FIG. 1 illustrates the overall structure of a broadcasting system according to the invention.

FIG. 1 shows an overall view of a system 10 for delivering digital content to user devices 3, and in particular video content, according to the invention. The following description will be made with reference to video content, for illustrative purposes only. However, it will be understood by those of ordinary skill in the art that digital content may encompass other type of content such as audio or text content.

The system 10 includes a source unit 2 connected through a communication network 4 to one or more user devices 3. The communication network 4 may be a broadcasting network or a multicast network. Such network allows a point-to-multipoint (PTM) communication where data packets are simultaneously transmitted from the source unit 2 to multiple user devices 3. On the broadcasting embodiment of the invention, the source unit 2 is arranged to deliver digital content to the user devices 3 that are connected to the broadcasting network 4, for example over the air (either terrestrial or via satellite). In the multicast embodiment of the invention, services are only delivered to the user devices 3 that have joined a particular multicast group, interested in a certain kind of content. The following description will be made with reference to a broadcasting network 4, and a broadcasting source unit 2, also referred to thereinafter as "broadcasting unit", although the skill person will readily understood that the invention also applies to a multicast network.

The broadcasting unit 2 is connected to content providers that provide their actual digital content. The content providers may include for instance television and/or digital television service providers.

The user devices 3 may be any network-enabled device, and in particular any network-enabled mobile device, such as a personal digital assistant (PDA), a cellular telephone, a mobile terminal, a personal video recorder, a portable television, a personal computer, a digital camera, etc.

Although the invention has particular advantages for such user devices, the skilled person will readily recognize that any type of user device suitable for the reception of the broadcasted digital content could be used alternatively. The description thereinafter will be made with reference to a user device of the type mobile phone, for illustrative purposes only.

Each user device 3 is provided to receive digital content broadcasted from the broadcasting unit 2 through the communication network 4.

The system 10 further includes a retransmission manager 8 connected to all the user devices 3 in the communication network 4 through a second communication network 5. The second communication network 5 is preferably a point to point communication network such as a 2G (second generation) or 3G (third generation) cellular networks. The retransmission manager 8 manages retransmission of data which have been received from user devices 3 and for which poor quality has been detected. The retransmission manager 8 is accordingly arranged to send retransmission requests to the broadcasting unit 2 identifying corrupted data and the associated user devices 3. The broadcasting unit 2 will in turn resend the requested data to the associated user device 3. In the present description, the term "corrupted" should be understood as designating data having an insufficient quality level with regards to a quality threshold.

Figure 2:
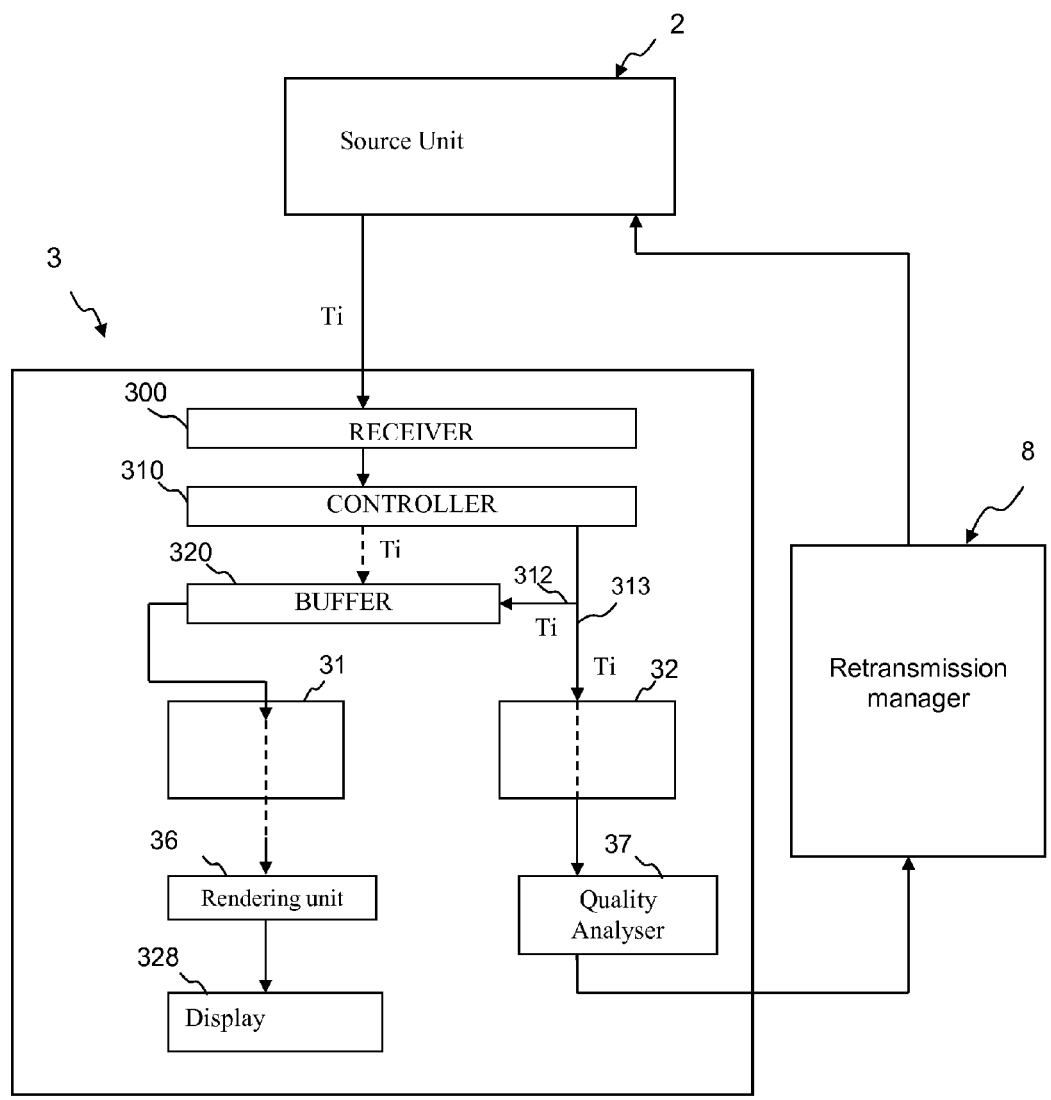
FIG. 2 is a diagram showing the structure of the system according to the invention.

FIG. 2 shows the detailed structure of the system 10 according to the invention. FIG. 2 only shows one user device 3, for more clarity.

Each user device 3 comprises a receiver 300 for receiving video content from the broadcasting unit 2 in the form of discontinuous bursts of content Ti, a controller 310 for determining whether the burst Ti is a retransmission of a previously received burst, and a buffer 320 for storing received bursts for a predefined buffer duration. The bursts will be referred to thereinafter as "video containers".

If the controller 310 determines that the current video container Ti is not a retransmission of a previously received video container, then it duplicates video container Ti, pushes Ti in buffer 320 (arrow 312), and transmits the duplication of video container Ti to a quality analyzer 37, through a processing unit 32 which decodes the video container.

The quality analyzer 37 is provided to evaluate the quality level in the video container Ti. If the quality analyzer 37 detects that the quality level in the video container is not satisfying, it notifies the corrupted video container Ti to the retransmission manager 8.

To detect whether the quality level in the video container is satisfying or not, the quality analyzer 37 may determine whether a quality indicator related to the quality of the video container matches a quality condition. For example, the quality of the video container will be determined as insufficient, if the quality indicator is lower than a predefined quality threshold.

Accordingly, the quality analyzer 37 may be adapted to evaluate a quality indicator for the current video container Ti and to determine whether the quality indicator is lower than the predefined quality threshold. The quality indicator may be a parameter related to subjective video quality representing how a video sequence is perceived by the end user, such as the Mean Opinion Score (MOS) parameter which provides a numerical indication of the perceived quality of received media after compression and/or transmission, or the Quality of Experience (QoE) parameter.

If it is determined that the quality indicator is lower than the quality threshold, information related to the corrupted burst Tk is then sent to the retransmission manager 8.

The video container Ti is thus buffered at the user device for the predefined buffer duration (arrow 312), whether or not an insufficient quality level is detected for a given video container, If an insufficient quality level is detected in the current video container Ti, the user device 3 will notify the corrupted video container to the retransmission manager 8. If the quality level is sufficient, no notification is sent to the retransmission manager 8 and the video container remains in buffer 320 until expiry of the buffering duration.

The retransmission manager 8 is connected to the user devices 3 in the broadcasting network so that it may receive notifications identifying corrupted video containers therefrom. The retransmission manager 8 comprises at least one management table 80 (FIG. 6A) thereinafter called "container table" for maintaining information concerning the corrupted video containers detected by the user devices 3.

Periodically, or in response to a triggering event, the retransmission manager 8 will select a number of corrupted video containers from the container table, based on predefined rules. The quality manger 8 will then transmit information identifying the selected corrupted video containers to the broadcasting unit 2 for retransmission.

The controller 310 further determines whether a received video container Ti is a retransmitted video container or not. The controller 310 will simply replace the previously received video container with the retransmitted one in buffer 320, as shown by arrow 311, with no subsequent analysis of the video container quality by quality analyzer 37.

Once the buffer duration elapses, the video containers are retrieved from the buffer 320 out of order and transmitted to a rendering unit 36, for example a player, through a processing unit 31. The rendering unit 36 processes the video containers and provides the proper instructions to the display 38 for displaying the video.

The broadcasting unit 2 may use an IP datacasting (IPDC) network 4 to broadcast digital content. IPDC is a combination of digital broadcast and Internet Protocol. Through such an IP-based broadcasting network 4, the broadcasting unit 2 can supply different types of video streams and in particular Digital Video Broadcasting (DVB) streams. One type of DVB is Digital video broadcasting-handheld (DVB-H), a recently developed technology that increases the capabilities and services available on small handheld user devices 3, such as mobile telephones.

According to the Digital Video Broadcast—Handheld (DVB-H) standard, the broadcasting unit 2 is provided to broadcast the digital content in the form of discontinuous bursts, also called "time-sliced" bursts. Between bursts, the receiver of the user device 3 can be shutdown resulting in considerable power savings, and accordingly longer battery lifetime for the user device 3. "Time slicing" technology is employed to reduce power consumption for small handheld terminals. Time-slicing means that the digital content is delivered to the handheld device 3 in bursts at given intervals of time. When the user device receiver 300 is not receiving the wanted burst of data, the tuner contained in the handheld device is "inactive" and therefore using less power.

The following description will be made with reference to DVB-H technology for illustrative purposes only. However, the invention is not limited to a DVB-H application and may involve other digital broadcasting technologies.

Figure 3:
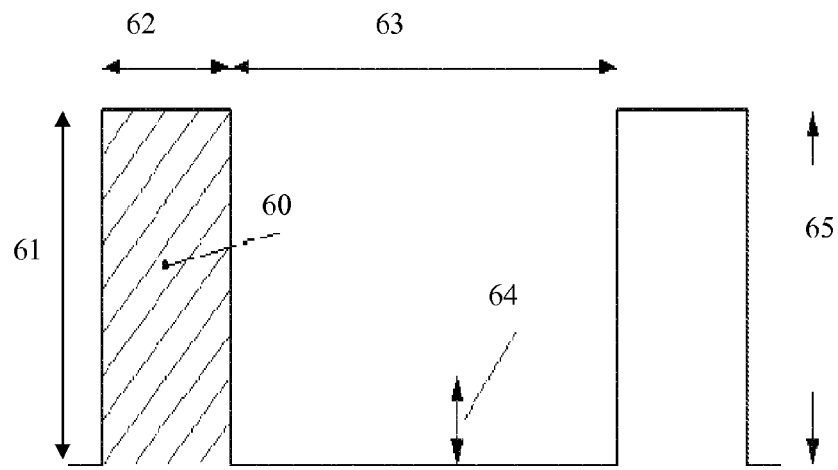
FIG. 3 is a table illustrating the structure of a MPE-FEC frame.

FIG. 3 illustrates a time-slice structure according to DVB-H technology. As shown, time slices 60 are bursts or video containers where the relevant data are transmitted. DVB-H provides a channel with a constant, maximum bandwidth, for all video streams and data. The different video streams of an initial video sequence are somewhat radiated, each video stream having a nominal bandwidth. The user device receiver 300 (DVB-H receiver) is switched when the data are not available. The user device receiver 300 is woken up when the next burst is expected.

A time-sliced elementary stream has the following features:
the burst size 61 representing the bitrate used by a time-sliced elementary stream when transmitting a burst;
the burst duration 62 representing the time from the beginning to the end of a burst;
the off-time 63 representing the time between bursts. During off-time, no transport packets are delivered on the relevant elementary stream;
the constant bit rate 64 representing the average bit rate required by the elementary stream when not Time-sliced; and
the burst bit rate 65 representing the bit rate used by the time-sliced elementary stream when transmitting a burst.

Figure 4:
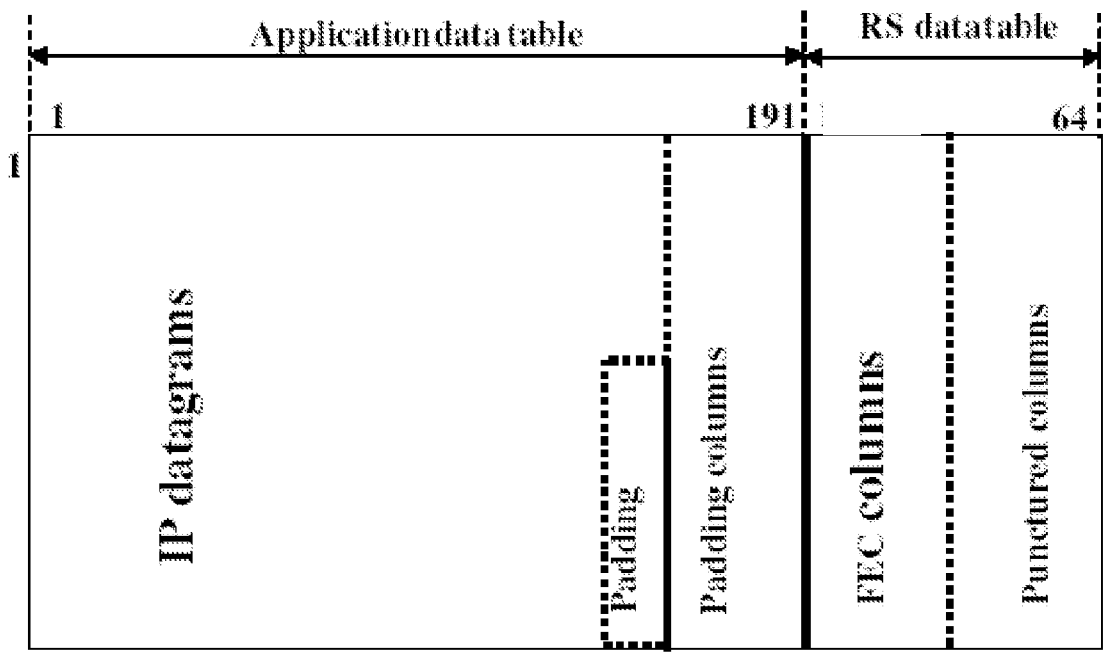
FIG. 4 is a functional diagram showing the different elements involved in a digital transmission according to a DVB-H embodiment of the invention.

DVB-H may also provide improved transmission robustness through the use of an additional level of forward error correction (FEC) at the Multi Protocol Encapsulation (MPE) layer. MPE-FEC adds redundancy to the data. An MPE-FEC frame is arranged as a matrix with 255 columns and a flexible number of rows as shown in FIG. 4. The number of rows may vary from 1 to 1024. The protection is ensured by the Reed-Solomon code used for the MPE-FEC block. The code takes 191 bytes, adds 64 parity bytes of redundancy, and by using the cyclic redundancy check (CRC) in the MPE-FEC packet header, it flags the MPE-FEC packet contents as unreliable if the CRC check fails. If the MPE-FEC packet contents are unreliable, the bytes in the packet are termed "erasure" symbols, and using erasures allows the decoder to correct twice the number of bytes that could be corrected if erasures were not used. The left part of the MPE-FEC frame, consisting of the 191 leftmost columns, is dedicated to IP datagrams and possible padding. The right part of the MPE-FEC frame, consisting of the 64 rightmost columns, is dedicated to the parity information of the FEC code. An MPE-FEC frame is divided into sections so that an IP datagram forms the payload of an MPE-section and a redundancy column form the payload of a FEC-section.

Figure 5:
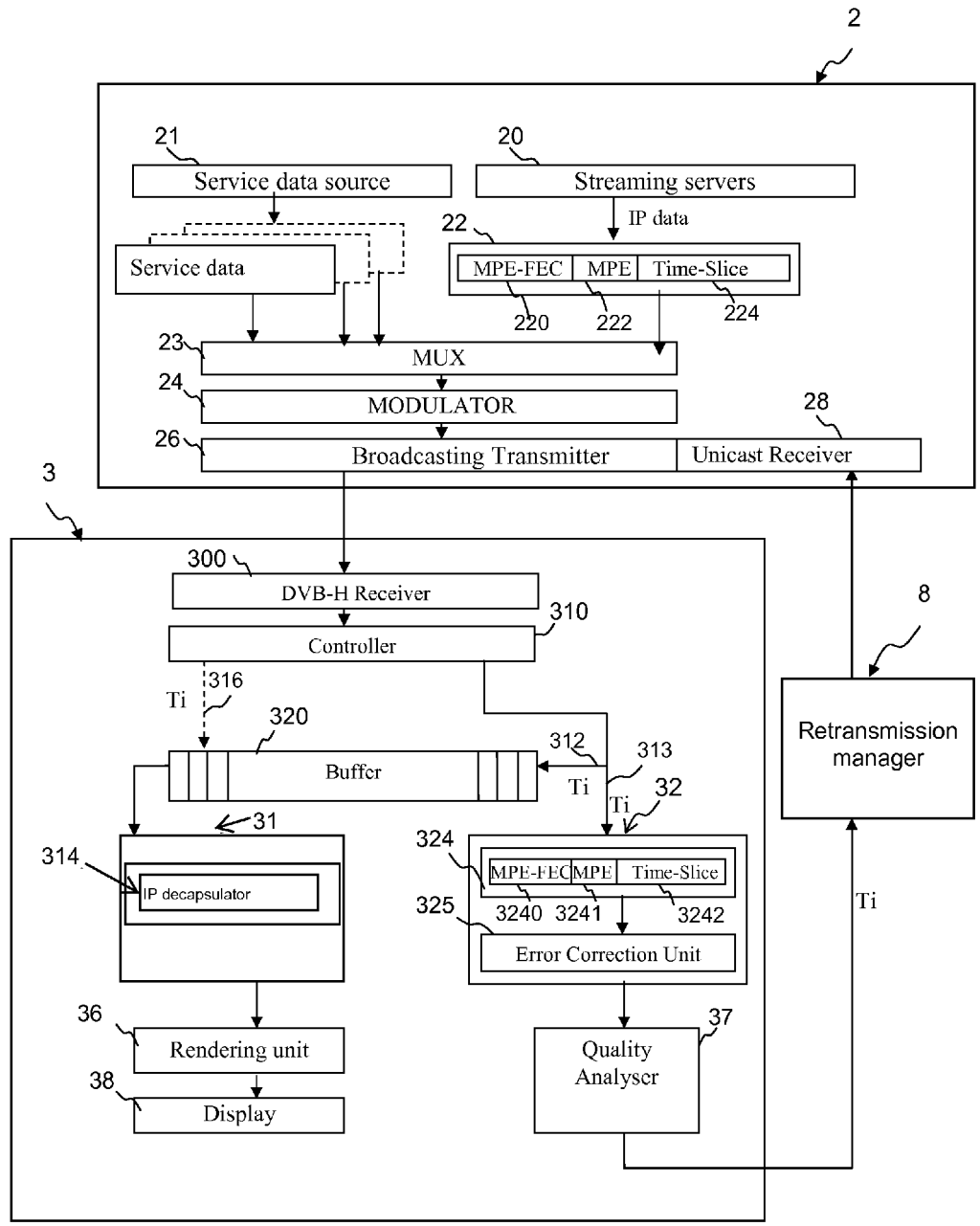
FIG. 5 is a diagram showing the structure of the system according to the DVB-H embodiment of the invention.

FIG. 5 shows a detailed structure of system 10, according to the DVB-H embodiment of the invention. In FIG. 5, same reference numerals as in FIG. 2 are used to designate similar elements. Further, FIG. 5 only shows a unique user device 3 for more clarity.

In the broadcast head-end side, the broadcasting unit 2 includes one or more multimedia streaming servers 20 for delivering digital content to user devices 3 in the communication network 4 through a streaming protocol, such as RTP, and a source 21 for other IP data, containing, e.g., ESG (electronic service guide) data or MP4 files with media data, delivered with a file delivery protocol, such as file delivery over unicast transport (FLUTE).

The Real-time Transport Protocol (RTP) may be used for streaming data from a streaming server 20, where audio, video and subtitling are delivered in real time. The FLUTE (file delivery over unicast transport) protocol may be used for service data from source 21, and for retransmitted corrupted video containers. "FLUTE" protocol (file delivery over unicast transport) employs the user datagram protocol (UDP) as its underlying transport protocol.

The multimedia streaming servers 20 more specifically provide the digital content in the form of IP (Internet Protocol) multicast streams containing digital content such as audio, video, and/or text.

The broadcasting unit 2 further includes a DVB-H encapsulator 22, a multiplexer 23, a modulator 24 and a transmitter 26. The streaming servers 20 send one IP multicast stream to the DVB-H encapsulator 22 for encapsulation.

The DVB-H encapsulator 22 captures the IP multicast packets sent by the streaming servers 20 and then encapsulates them in a DVB transport stream TS. The DVB-H encapsulator 22 provides means to generate a MPE block 220, a MPE-FEC block 222 and a time slicing block 224.

The multiplexer 23 may comprise suitable logic circuitry for multiplexing IP encapsulated DVB-H data from encapsulator 22 and the service data from the source 21. The multiplexer 23 combines transport streams from one or more different sources 20 and 21. The resulting stream is sent to the modulator 24, which converts the transport stream from a digital representation into a radio frequency (RF) signal before transmission to the user device 3 through the transmitter 26. The transmitter 26 amplifies the RF signal and broadcasts the signal to the user devices 3.

As a result, digital content such as a streaming video program can be transmitted to the user device 3 during time slots, i.e., by fragmenting the digital content into bursts or video containers which occur in particular portions of time slots (or "time slices"). Each burst has a fixed duration and consecutive bursts are separated in time by a time interval.

Each user device 3 is connected to the broadcasting unit 2 through a wireless or a wired communication network 4. An Example of a wired communication network may be based for instance on GPRS/EDGE/UMTDS.

The communication network 4 may be an IP network which provides a communication service using an Internet protocol, and can provide an IPv6 network service. Through the IP network 4, a transport stream from the DVB-H broadcasting unit 2 is provided to the user device 3. The user device 3 can access the IP network 4 by using an IP network service, particularly, an IPv6 network service, and receive the DVB-H transport stream TS from broadcasting unit 2 through access to the IP network 4.

The user device 3 is configured to receive, decode and process transmissions. The user device 3 may include a receiving antenna to receive wireless transmissions. In addition, the user device 3 includes the receiver 300, the controller 310, the buffer 320, the processor 32, the rendering unit 36 connected to a display 38, and the video analyzer 37 connected to a retransmission manager 8, as described above with reference to FIG. 2. The skilled person will readily understood that the user device 3 may include other components not shown, such as a battery, a speaker, one or more antennas, a housing, a user interface, etc.

The receiver 300 is configured to receive DVB-H formatted transmission signals corresponding to a TV slot delivered by the streaming server 20 through a streaming protocol such as RTP, as well as datacast slot delivered by source 21 where various asynchronous data may be sent using a file delivery protocol such as Flute.

The receiver 300 receives and demodulates the inbound signal, and creates a video container in the form of a transport stream to make the signal available for processing.

The received video container is then pushed in buffer 320 for the predefined buffering duration. The buffering duration may take into account the time required by the retransmission manager 8 to receive notification from the user device, to select a set of video container and to request retransmission to the broadcasting unit 2 of the selected video containers. Alternatively, buffer 320 may be a shift register.

Prior to buffering the transport stream Ti, the user device 3 duplicates the transport stream and transmits the copy of the transport stream to the quality analyzer 37 for quality analysis through a processing unit 32.

The processing unit 32 includes a decapsulator 324 for decapsulating the copy of the transport stream packet and reforming sections. The sections are decapsulated into the MPE-FEC frame. The decapsulator 320 more specifically includes a MPE block 3240 and a MPE-FEC block 3241 for decoding the inbound information into multiprotocol encapsulation forward error correction (MPE-FEC) sections along with erasure information, and parsing through the MPE-FEC sections to extract IP datagrams. A time-slicing block 3242 may further extract from the demodulated RF signal start and end instants of received data bursts for synchronizing the processing of the MPE-FEC sections by MPE-FEC block 3241. The time-slicing block 3242 may mute the receiver 300 for example between each two consecutive transmission data bursts.

The processing unit 32 may further include an error correction unit 325 for correcting specific error in the video container, such as an MPE-FEC decoder that receives the MPE-FEC sections from decapsulator 324 and apply an error correcting code such as the Reed-Solomon code to correct the IP datagrams extracted by the decapsulator 324. The Reed-Solomon Code only allows correction of specific errors that occur during transmission or storage for a limited number of reasons (for example noise or interference, etc). It does not allow correction of errors due to video quality and in particular subjective video quality as perceived by the end user.

The quality analyzer 37 is provided to evaluate the quality indicator for the IP datagrams obtained from the decapsulation of the current transport stream Ti and to determine whether the quality indicator is lower than the predefined quality threshold. The quality analyzer 37 may comprise a quality analyzer buffer for buffering each received video container prior to analyzing quality of the video containers.

If the quality indicator is lower than the quality threshold, information related to the corrupted transport stream Ti is sent to the retransmission manager 8 to notify the corruption.

When the buffer duration elapses, the user device 3 retrieves the bursts out of order from buffer 320. More specifically, the user device 3 retrieves the video container from the buffer 320, out of order, and transmits each video container thus retrieved to another processing unit 31. The processing unit 31 may have a structure similar to the processing unit 32, with an IP decapsulator 314 for extracting the IP datagrams, including a MPE block 3140, a MPE-FEC block 3141, and a time-slicing block 3142, and an error correction unit 315 for error correction, using MPE-FEC decoding.

Then, the IP datagrams corresponding are transmitted to the rendering unit 36, e.g., a video player, which will then render the received datagrams.

Alternatively to processing units 31 and 32, a unique processing unit with a structure similar to the processing units 31 and 32 could be used upstream of buffer 320 for decoding and applying error correction to the received video containers prior to duplication. The following description will be made with reference to processing unit 31 and 32 for exemplary purpose.

Prior to buffering the transport stream in buffer 320, the controller 310 checks if the transport stream Ti is a retransmitted stream. This may occur if a notification was previously sent to the retransmission manager 8, as a result of the detection of an insufficient quality level for the video container Ti, and if the transport stream Ti was selected for retransmission.

If the controller 310 determines that Ti is a retransmitted transport stream, then it simply replaces the previously received stream with the newly received transport stream Ti, with no subsequent duplication and quality analysis At the broadcasting unit level, request for retransmission may be received by a unicast receiver 28, and transport streams for which a retransmission request has been received may be retransmitted using the FLUTE protocol.

Figure 6A:
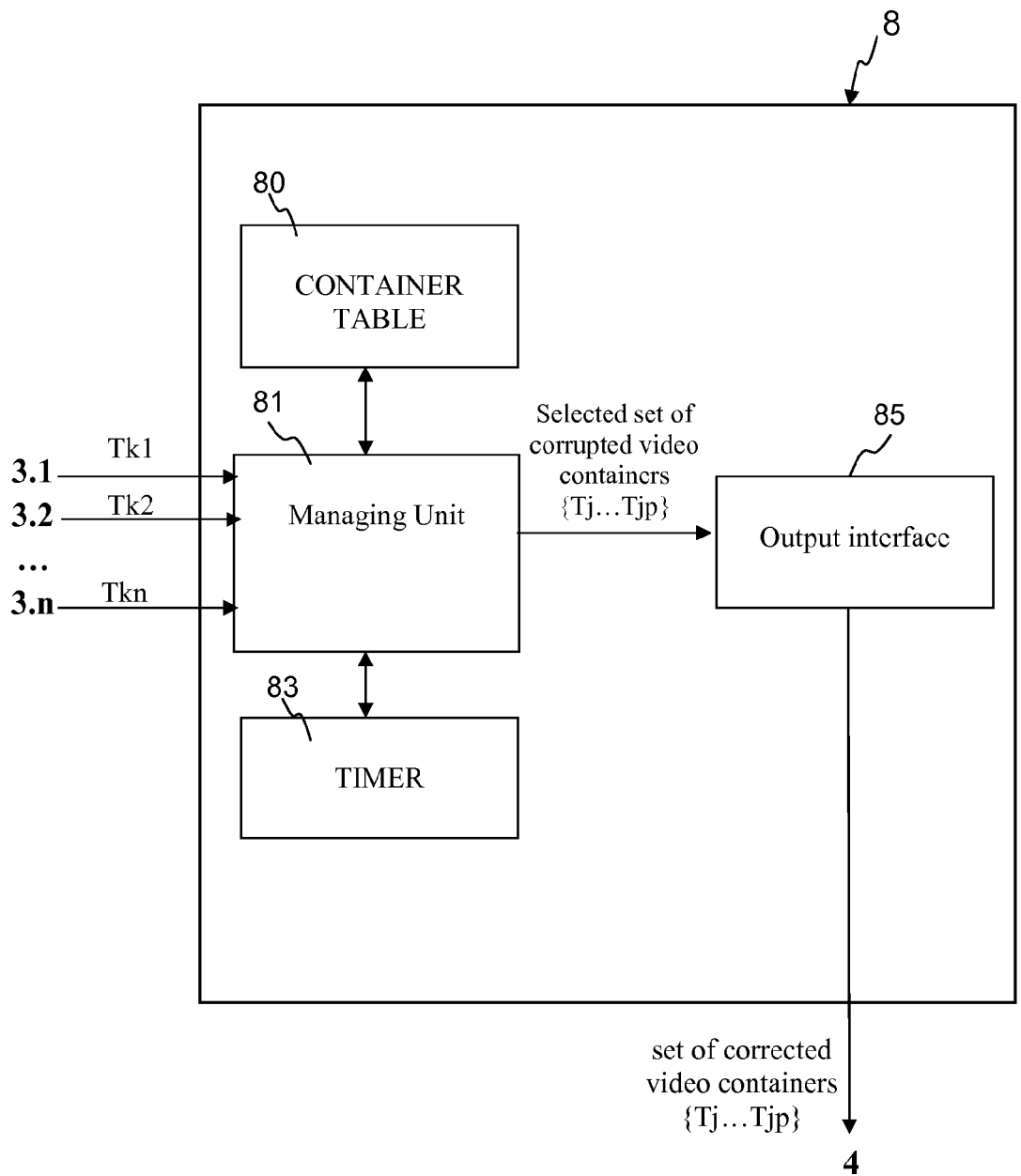
FIG. 6B is a diagram illustrating the structure of the management unit according to the present invention.

FIG. 6A shows the structure of the retransmission manager 8 according to the invention. The retransmission manager comprises one or more container tables 80 for storing the information Tk1, TK2, . . . , TKn related to video containers for which a notification has been received from the user devices 3. The following description will be made with reference to a retransmission manager 8 comprising a unique container table 80, for illustrative purposes only.

The retransmission manager 8 is communicatively coupled to all the user devices 3.1, 3.2, . . . , 3.n in the network 4. Thereby, it centralizes information related to all the video containers which have been received with insufficient quality in the network, and which accordingly require retransmission.

The retransmission manager 8 further comprises a managing unit 81 for checking the container table 80, at a predefined time interval monitored by timer 83. The managing unit 81 more specifically selects a set of corrupted video containers from the container table 80 in response to those video containers matching predefined rules. The selected set of video containers is then transmitted to the broadcasting unit 2 through the output interface 85 as candidates for retransmission.

The retransmission manager 8 is arranged to take into account all the notifications received from the user devices in the network, and not solely from a unique user device. Further, the decision as to whether a video container is to be retransmitted or not may depend on a variety of conditions, such as the total number of notifications received by the retransmission manager 8, broadcasting conditions (available bandwidth), priority conditions (in a pay per view application), level of video container quality, etc.

According to a particular embodiment of the invention, the notification emitted by a user device to the retransmission manager 8 for a given video container may include information identifying the video container such as a channel identifier CH identifying the transmission channel through which the video container was received by the user device, a sequence number S identifying the video container, and the quality indicator Q evaluated for the video container. The retransmission manager 8 is arranged to maintain the container table 80 based on these data. More specifically, each entry of the container table 80 may be related to a given video container for which notifications have been received, and may comprise the sequence number S of the video container, in association with the channel identifier identifying the transmission channel of the video container, and a parameter related to the quality indicator Q.

Figure 6B:
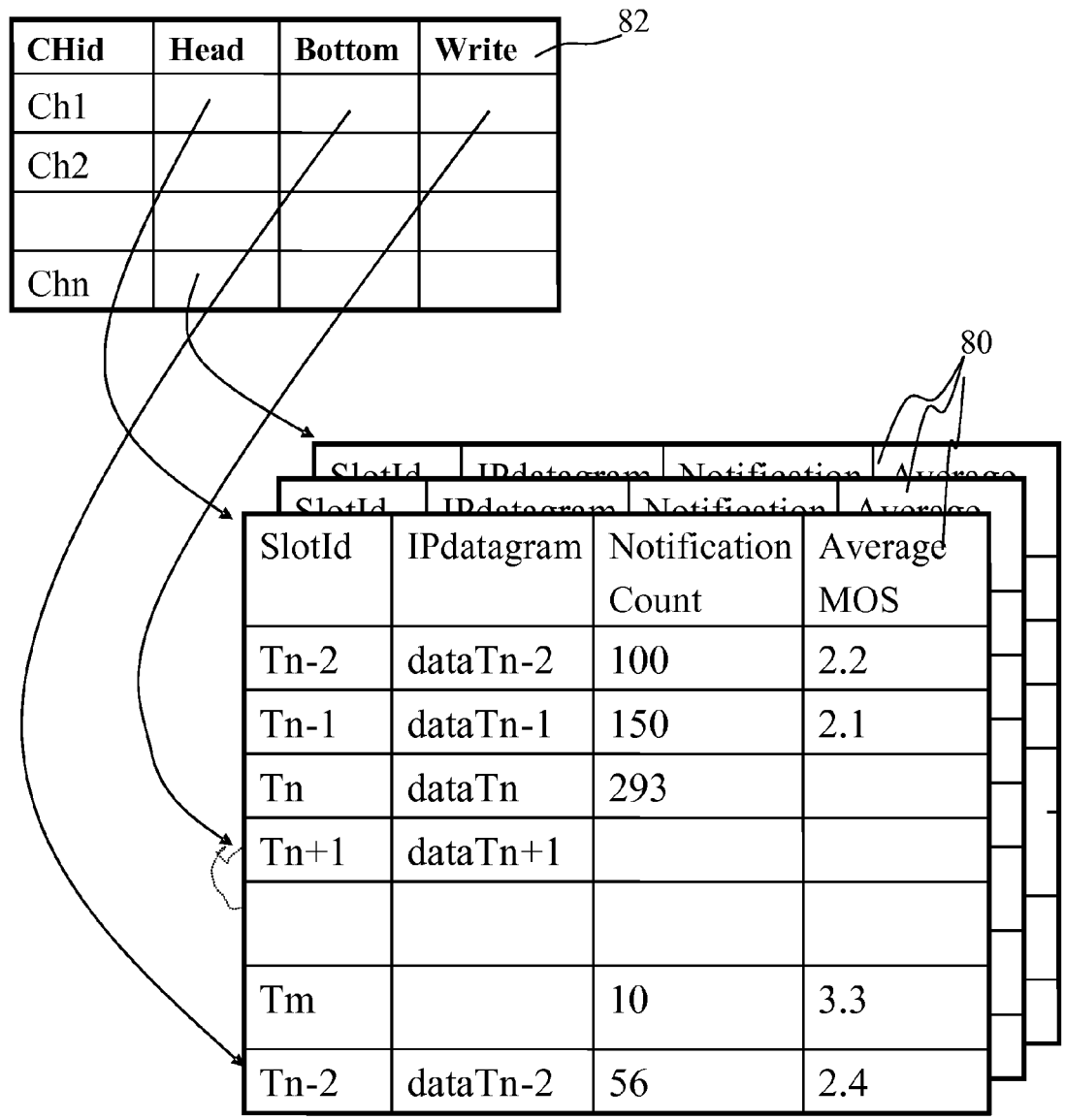

According to another embodiment of the invention, illustrated in FIG. 6B, the retransmission manager 8 may comprise a plurality of container tables 80, each maintained for a given channel Ch1, Ch2, . . . , Chn.

According to this embodiment of the invention, there are as many container tables 80 as Video channels Ch. Container tables are accessed through a channel table 82, in which each row is allocated to a particular video channel Ch1, Ch2, . . . , Chn. Each channel entry in the channel table 82 has three pointers pointing respectively towards the beginning, the end, and the current writing position within the associated container table 80. As shown, each container table 80 includes a number of entries each related to a given video container Tn−2, Tn−1, Tn, Tn+1. Each exemplary container table 80 shown in FIG. 6B is a circular table having a size related to the user device size. Each container table 80 represented in FIG. 6B includes 4 columns:

The first column identifies the time slot associated with a video container Ti;

The second column contains the IP datagram included in a video container Ti;

The third column contains the total number of notifications received from the user devices for the same video container Ti. This number may be updated each time a new notification is received for Ti; and The fourth column includes the average quality indicator value, such as the Average MOS. This average value may be updated each time a new notification is received, including a quality indicator value, from a user device for a video container Ti.

The retransmission manager 8 may select the video containers to be retransmitted based on predefined rules related to parameters of the third and/or fourth columns (total number of notifications, average quality indicator).

Figure 7:
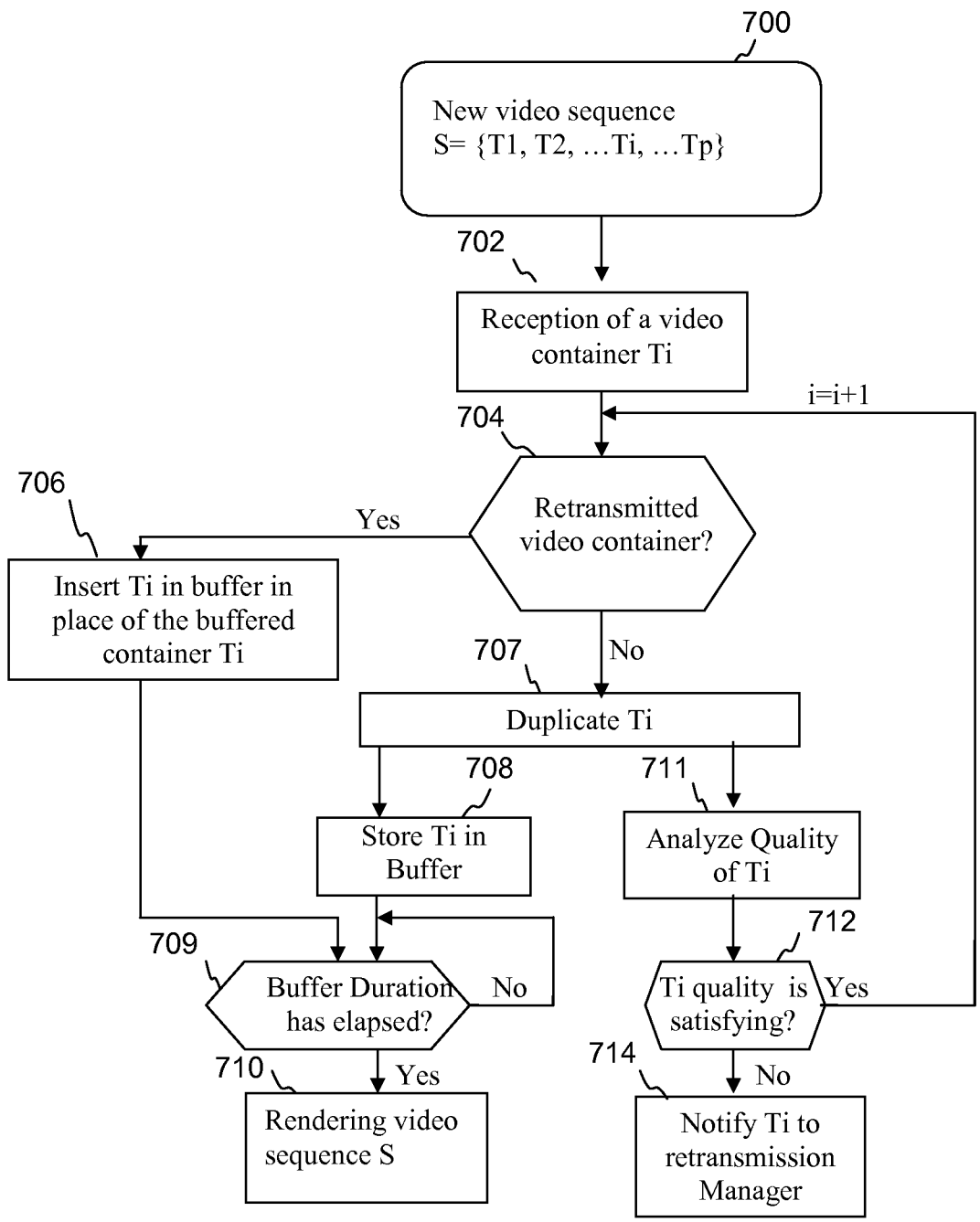
FIG. 7 is a flowchart showing the steps performed to detect corrupted video containers.

FIG. 7 is a flowchart illustrating the steps performed by a user device 3 to detect a corrupted video container.

At step 700, the user device 3 starts to receive a new video sequence S in the form of time-sliced video containers T1, T2, . . . Ti . . . Tp.

At step 702, the user device 3 receives a given video container Ti. At step 704, the user device 3 then checks if the video container Ti is a retransmitted video container, for example by checking whether buffer 320 already contains the video container Ti. This occurs in a situation where video container Ti was previously identified as corrupted, resulting in a notification being sent to the retransmission manager 8 for Ti, and in a subsequent selection of for retransmission by the retransmission manager 8. The user device 3 then accordingly replaces the buffered video container with the newly received video container Ti at step 706. No subsequent quality evaluation is performed and the video container Ti is inserted as is.

If the video container Ti is a retransmitted video container, the user device 3 duplicates at step 707 the video container Ti. Then, the user device 3 pushes on the one hand the video container Ti in buffer 320, and on the other hand processes the copy of the video container Ti to analyze its quality at step 711. Step 711 may include a prior step of decoding the video container and applying an error correction algorithm such as the Reed Salomon code. Then a quality indicator may be computed for the video container, and in particular an indicator related to the quality as perceived by the user, such as a MOS (Mean Opinion Score) or QoE (Quality of Experience) parameter.

At step 712, the user device then determines whether the quality level of the video container is satisfying, which may include for instance determining whether the quality indicator is lower than a predefined quality threshold. If so, the user device 3 waits for the next video container Ti+1 to be received and repeats steps 704 to 713 for the next video container Ti+1.

If it is determined at step 712 that the quality of the video container is not satisfying (e.g., the quality indicator is lower than the quality threshold), then the user device 3 sends information related to the video container Ti for requesting retransmission, at step 714, and repeats steps 704 to 714 for the next video container Ti+1.

At the buffer level, when the buffering duration elapses, the user device 3 retrieves the buffered video containers out of order from buffer 320 and transmits them to the rendering unit 36 (e.g., a video player), which in turn will render the video sequence S={T1, T2, . . . Ti, . . . Tp}, whether or not all video containers for which retransmission were requested have been received.

Figure 8:
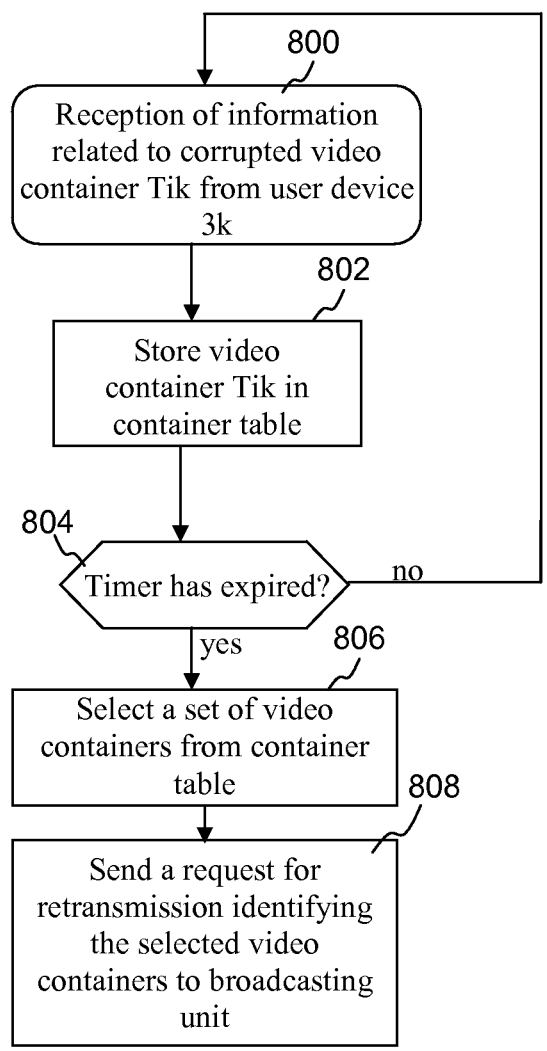
FIG. 8 is a flowchart showing the steps performed to select a set of corrupted video containers for retransmission.

FIG. 8 is a flowchart illustrating the steps performed by the retransmission manager 8. FIG. 8 is described with reference to the container table structure illustrated in FIG. 6B.

At step 800, the retransmission manager 8 receives a notification related to a video container Tik from a user device 3k. The user device 3k has sent this notification due to the detection of a poor quality level for video container Tik, as described with reference to FIG. 7. The notification contains information related to the video container Tik, such as the quality indicator Q, the channel identifier CH identifying the transmission channel of the user device and the sequence number S identifying the video container At step 802, the retransmission manager 8 increments the notification count to update the field representing the total number of notifications (third column of the container table) for the entry related to video container Tik in the container table 80 associated with the channel CH. It also updates the average quality indicator for the video container Tik in the container table 80 based on the quality indicator value Q (fourth column of the container table).

At step 804, the retransmission manager 8 checks whether the timer 83 has expired. If not, the retransmission manager 8 repeats steps 800 and 802 for the other notifications received by the user devices.

Step 804 may be performed periodically until expiry of the timer 83.

At step 808, the retransmission manager 8 then sends a request for retransmission identifying the set of selected video containers to the broadcasting unit 2.

If it is determined at step 804 that the timer has expired, the retransmission manager 8 selects, at step 806, a set of video containers from container table 80 based on predefined rules as candidates for retransmission.

Figure 9:
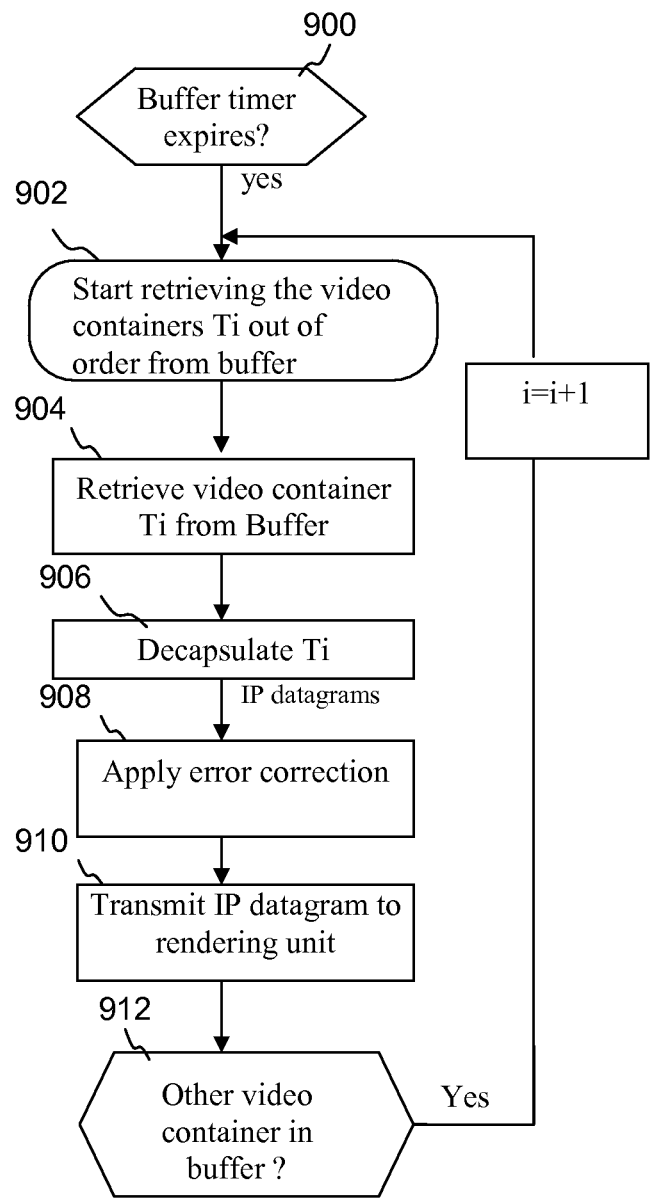
FIG. 9 is a flowchart showing the steps performed to render the received video containers.

FIG. 9 illustrates the steps performed to render a video sequence S={T1, T2, . . . Ti, . . . Tp}.

At step 900, the user device 3 checks whether the buffer timer has expired. If so, the user device 3 starts retrieving the video containers Ti out of order from buffer 320, at step 902. More specifically, the user device 3 retrieves each video container Ti according to the buffering order at step 904.

Then, at step 906, the user device 3 decapsulates the video container Ti to reform section by decoding Ti inbound information into multiprotocol encapsulation forward error correction (MPE-FEC) sections along with erasure information, and parsing through the MPE-FEC sections to extract the IP datagrams.

At step 908, the user device 3 may apply error correction to the MPE sections. Step 908 may include applying the Reed-Solomon code resulting in corrected IP datagrams, to correct errors that occurred during transmission or storage for specific reasons (for example, noise or interference, scratches on a CD, etc). The rendering unit 38, e.g. a player, then processes the corrected IP datagrams, at step 910.

At step 912, the user device 3 checks whether the buffer 320 contains other video containers, and if so repeats steps 904 to 912 for the next video container Ti+1.

Figure 10:
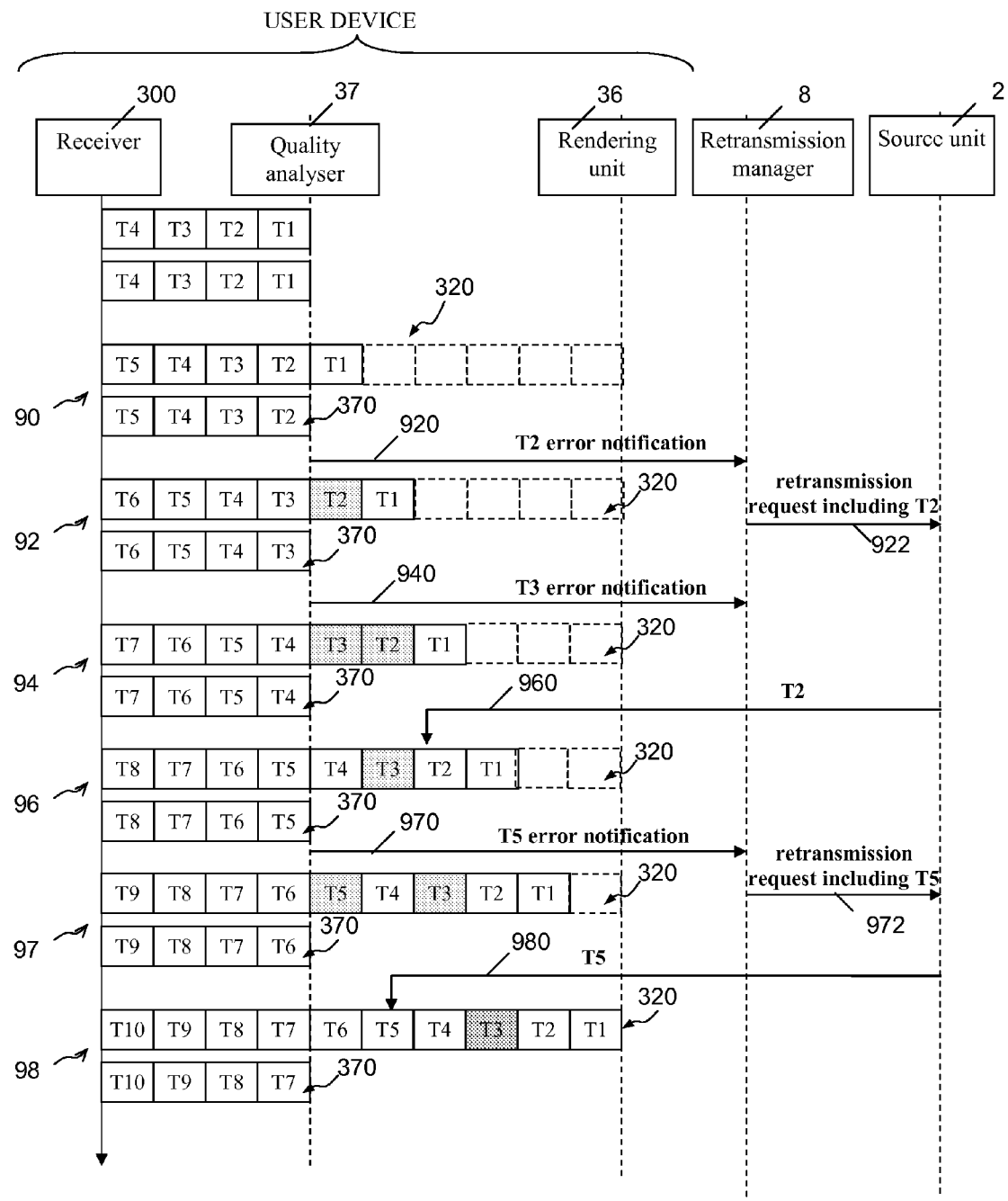
FIG. 10 is a diagram illustrating the reception of video containers.

FIG. 10 shows the data exchanged in system 10 for an exemplary video sequence, according to the invention.

The representation of FIG. 10 includes functional blocks between which data are exchanged. The skilled person will understand that the representation of FIG. 10 is for explanatory purpose, and should not be considered as limiting.

More specifically, FIG. 10 shows different states of a quality analyzer buffer 370 in a vertical axis, between the receiver block 300 and the quality analyzer 37. The quality analyzer buffer 370 represents the state of the video containers that are waiting to be processed at the quality analyzer 37. For example, at 90, the quality analyzer buffer contains data blocks T2, T3, T4, T5 that are to be processed.

There is also shown in the vertical axis the processing state of buffer 320 above the quality analyzer buffer 370, at the different phases 90, 92, 94, 96 and 98. Schematically, buffer 320 extends up to the rendering unit 36.

Accordingly, at each phase 90 to 98, there is shown the processing state of the video containers at buffer 320 and at the same time the corresponding state of the data blocks at the quality analyzer 37.

At step 90, video container T1 is pushed in 320. At the same time T1 is analyzed for human perception quality by the quality analyzer 37 and the quality is found acceptable.

At step 92, video container T2 is pushed in buffer 320. At the same time T2 is analyzed for human perception quality and the quality is found unacceptable. Analyzer 37 sends information related to the corrupted video container T2 to the retransmission manager 8.

At step 922, the retransmission manager selects a set of video containers from the container table, including container T2, and sends a request to the broadcasting unit 2 to request the retransmission of the selected video containers.

At step 94, video container T3 is pushed in buffer 320. At the same time T3 is analyzed for human perception quality by the quality analyzer 37 and the quality is found unacceptable. Analyzer 37 sends information related to the corrupted video container T3 to the retransmission manager 8.

At step 96, video container T4 is pushed in buffer 320. At the same time T4 is analyzed for human perception quality by the retransmission manager 37 and the quality is found acceptable. At the same time slot, the video container T2 for which a retransmission request was sent at step 922 is received and inserted in place of the corrupted video container T2 in the buffer 320.

At step 97, video container T5 is pushed in buffer 320. At the same time, T5 is analyzed for human perception quality by the quality analyzer 37 and the quality is found unacceptable. Analyzer 37 sends information related to the corrupted video container T5 to the retransmission manager 8.

At step 972, the retransmission manager selects a set of video containers from the container table including container T5 and sends a request to the broadcasting unit 2 to request the retransmission of the selected video containers.

At step 98, video container T6 is pushed in buffer 320. At the same time, T6 is analyzed for human perception quality by the retransmission manager 37 and the quality is found acceptable. At the same time slot, the video container T5 for which a retransmission request was sent at step 972 is received and inserted in place of the corrupted video container T5 in the buffer 320.

At expiry of the buffering duration, the video containers T1 to T6 are retrieved from buffer 320 out of order and transmitted to the rendering unit 36 which renders the video sequence.

In the above example, only the video container T3 has not been resent by the broadcasting unit 2, due to the retransmission manager 8 not selecting this video container as candidate for retransmission. However, since the corrupted video container T3 originally received at 94 was stored in buffer 320, the operation of the rendering unit 36 is not delayed.

According to the invention, the retransmission manager 8 is further adapted to manage bandwidth negotiation sessions with content providers 7 and to select video containers from the container table 80 based on the negotiation information exchanged during the negotiation session.

Figure 11:
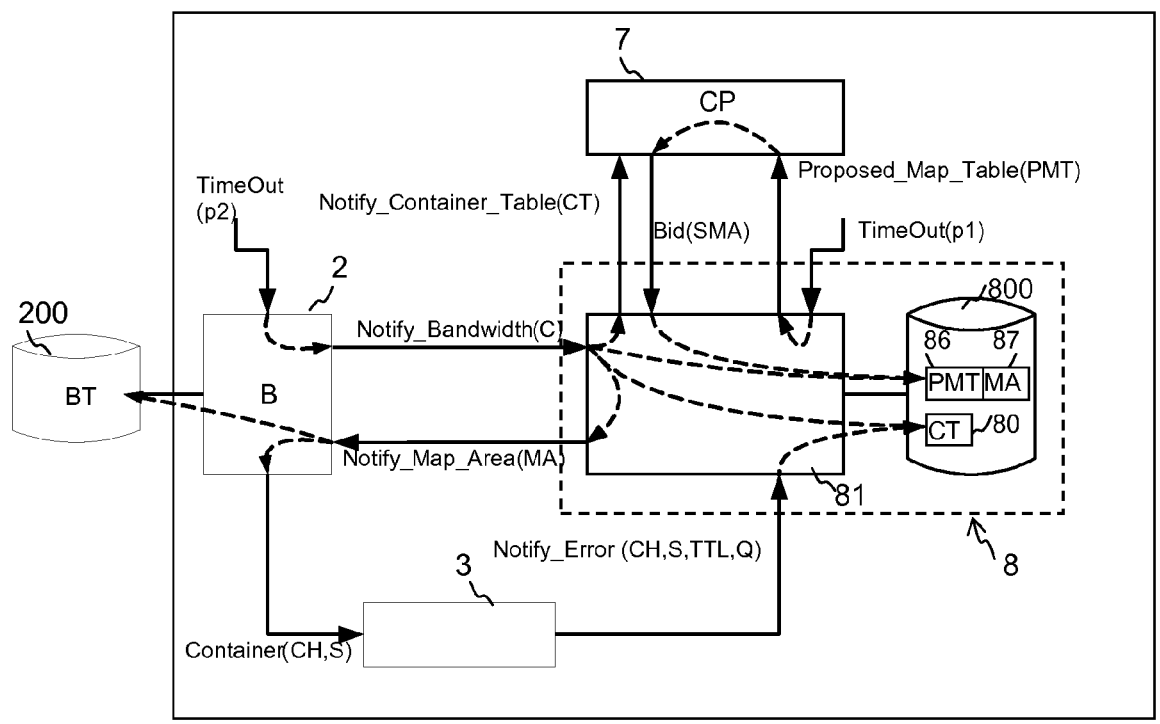
FIG. 11 is a diagram illustrating data exchanged for bandwidth negotiation.

FIG. 11 is a diagram showing the data exchanged during bandwidth negotiation.

The retransmission manager 8 is connected to the user devices 3 through a point to point communication for receiving notifications "Notify_Error" from the user devices 3, each notification being related to a particular video container.

Each notification received from a given user device for a video container may include a channel identifier CH identifying the channel through which the video container was received by the user device, a sequence number S identifying the video container and a quality indicator Q related to the quality of the video container.

Each notification may further include a Time To Live parameter TTL computed at the user device level for the video container. The Time To Live parameter represents the time limit up to which the video container can be retransmitted before it should be discarded.

The following description will be made with reference to such notification information, although the skilled person will readily understand that a notification emitted for a given video container from a user device 3 may provide other type of information or other combination of parameters.

The user device 3 may receive the channel identifier CH and the sequence number S information together with the video container from the broadcasting unit 2 ("Container (CH, S)").

As described above, the retransmission manager 8 maintains at least one container table 80 which comprises information related to video containers that are candidate for retransmission.

According to an embodiment of the invention, an entry in the container table 80 is created for each notification received. The container table 80 then includes for each entry related to a given video container, created for a given notification, a channel identifier CH identifying the transmission channel of the video container, a sequence number S identifying the video container, the TTL parameter received in the notification, and the quality indicator Q received in the notification.

According to another embodiment of the invention, the container table 80 only comprises one entry for each video container. The container table 80 then includes for each entry related to a given video container a channel identifier CH identifying the transmission channel of the video container, a sequence number S identifying the video container, an average $TTL_{average}$ of the TTL parameter determined from the TTL values received in all the notifications related to the video container, an average $Q_{average}$ of the quality indicator Q evaluated from the quality indicator values received in all the notifications related to the video container, and a notification count parameter N representing the total number of all the notifications received for the video container.

According to this embodiment, when a notification related to a video container is received from a user device 3, the retransmission manager 8 updates the average TTL parameter $TTL_{average}$, the average quality indicator $Q_{average}$ and the notification count N in the entry related to the video container, if an entry has already been created for that video container. If the container table does not contain any entry for the video container, it creates a new entry.

The following description will be made with reference to the embodiment of the invention, where the container table 80 includes for each entry related to a given video container, created for a given notification, a channel identifier CH, a sequence number S, the TTL parameter received in the notification, and the quality indicator Q received in the notification, for illustrative purposes.

The retransmission manager 8 is also connected to the content providers 7 through communication means to receive negotiation information therefrom. The negotiation information received from the content providers 7 are related to the video containers stored in the container table 80.

The retransmission manager 8 cooperates with the content providers 7 to select a number of video containers from the container table 80, based on negotiation information received from the content providers 7 and on the available bandwidth at the broadcasting unit 2. The selected video containers will be notified and retransmitted by the broadcasting unit 2.

The retransmission manager 8 is adapted to notify the container table 80 to the content providers 7 either periodically or after a retransmission request is sent to the broadcasting unit 2. This allows the content providers to have visibility on the video containers that require retransmission and initiate a negotiation session for the retransmission of one or more video containers.

More specifically, each content provider 7 may send to the retransmission manager 8 a negotiation message, including a negotiation parameter F such as a fee parameter, to start a new negotiation session or to participate to an ongoing negotiation session.

The negotiation message may be sent in the form of a table, thereinafter called Sub Map Area SMA. In response to the reception of a negotiation message SMA from a given content provider 7, the retransmission manager 8 updates a negotiation table 86 thereinafter called Proposed Map Table or PMT based on the negotiation information contained in SMA table.

The Sub Map Area table SMA includes a number of entries related to respective video containers. In particular each entry may include a channel identifier CH identifying the transmission channel of the video container, a sequence number identifying the video container and the negotiation parameter F proposed for the video container by the content provider 7.

The PMT 86 may have a similar structure as the structure of the Sub Map Area SMA for each entry.

Accordingly, the retransmission manager 8 may compare the negotiation parameter of each entry related to a given video container, in SMA table, with the negotiation parameters of the entries in the PMT 86, and adds the fields associated with the SMA entry in the PMT 86, if the negotiation parameter of the SMA entry is higher than the negotiation parameters of the PMT entries found for the same video container.

The retransmission manager 8 is further arranged to notify the PMT 86 to all the content providers 7. Thereby, each content provider 7 may have a visibility on the negotiation session state. The retransmission manager 8 is in particular arranged to notify the PMT 86 to all the content providers 7, periodically according to a period p1. These exchanges between the retransmission manager 8 and the content providers 7 allow the retransmission manager 8 to collect negotiation information.

The retransmission manager 8 may further receive a bandwidth notification "Notify_Bandwidth" from the broadcasting unit 2, periodically according to a period p2 or asynchronously. The bandwidth notification contains information related to the available bandwidth C at the broadcasting level.

When a bandwidth notification is received by the retransmission manager 8, the retransmission manager 8 is arranged to select entries from the PMT 86 based on the available bandwidth C and on the negotiation parameter F associated with the entries. The retransmission manager 8 then stores the selected records in a selection table also called thereinafter Map Area table (MA) 87.

The MA 87 includes entries related to respective video containers. Each video container for which an entry is provided in the MA 87 represents one of the video containers selected for retransmission. In particular each entry in the MA 87 includes a channel identifier CH identifying the transmission channel of the video container, a sequence number S identifying the video container and the negotiation parameter F proposed for the video container by a content provider 7.

The MA 87 thereby contains information related to a set of video containers among the candidate video containers that are identified in the container table 80. The video containers identified in the MA 87 form the selected video containers which will be notified to the broadcasting unit 2 for retransmission.

The retransmission manager 8 then sends a retransmission request "Notify_Map_Area (MA)" to the broadcasting unit 2. The retransmission request includes the MA 87 which contains the selected video containers.

Accordingly, the retransmission manager 8 maintains:
at least one container table 80 identifying video containers for which notifications have been received from the user devices 3 (candidates for retransmission);
A PMT 86 storing information related to video containers identified in the container table 80 and for which negotiation information have been received from the content providers 7;
An MA 87 storing information related to the video containers that have been selected from the PMT 86 based on the available bandwidth information received from the broadcasting unit 2.

Figure 12:
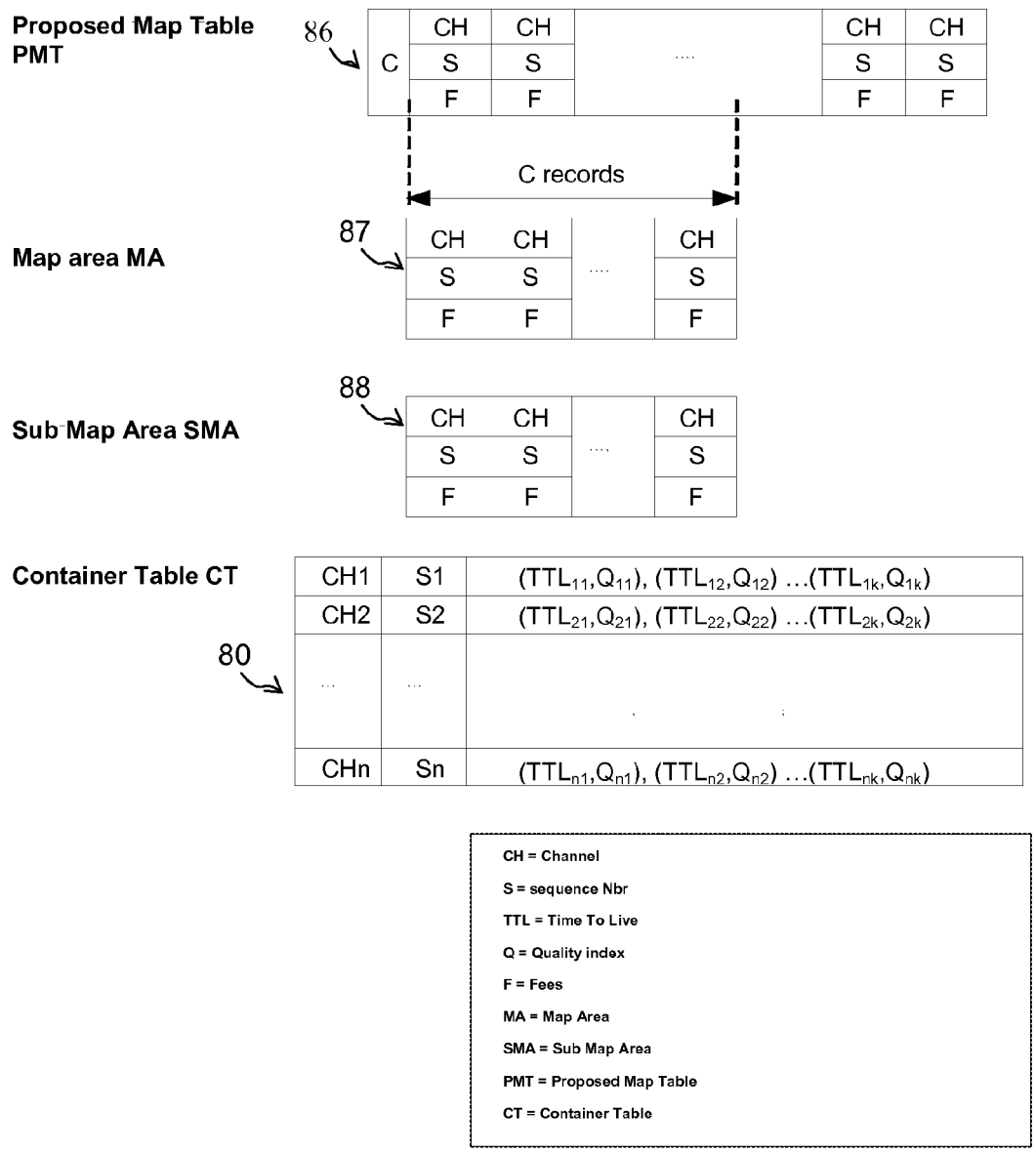
FIG. 12 illustrates exemplary tables maintained by the retransmission manager.

FIG. 12 shows exemplary structures for the PMT 86, the MA 87, the Sub Map Area 88, and the container table 80.

The PMT 86 stores information related to video containers for which a negotiation message has been received from the content providers 7. Each entry (represented in column) may include a negotiation parameter F such as a fee parameter corresponding to the fee the content provider is ready to pay for retransmission of the associated video container. Each entry further includes an identifier CH of the transmission channel of the video container, and a sequence number S identifying the video container. The PMT 86 further includes a bandwidth parameter C in the first column corresponding to the available bandwidth C notified by the broadcasting unit 2.

The MA 87 stores selected entries from the PMTs 86. Each entry of the MA 87 may include the negotiation parameter F such as a fee parameter F, in association with a channel identifier CH identifying the transmission channel of the video container, and the sequence number S identifying the video container. The video containers in MA 87 are selected based on the fee parameter values in the PMT 86 and on the available bandwidth C at the broadcasting unit 2.

The Sub Map Area Table (SMA) 88 stores the negotiation information proposed for a set of video container from the container table 80 by a given content provider 7. Each entry relates to a particular video container and may contain the same parameters as in PMTs and MAs, i.e., a channel identifier CH, a sequence number S and a fee parameter F. Each table SMA in managed by the associated content provider 7.

The container table 80 stores information related to video containers for which notifications where received from the user devices. Each entry is related to a particular video container, and may include a channel identifier, e.g., CH1, identifying the transmission channel of the video container, a sequence number identifying the video container, such as S1, a Time To Live parameter, such as TTL1, representing time limit up to which the video container can be retransmitted before it should be discarded, and a quality indicator, such as Q1, related to the quality of the video container.

The retransmission manager 8 may add a new entry in the container table 80 in response to the reception of a notification from a user device 3.

Figure 13:
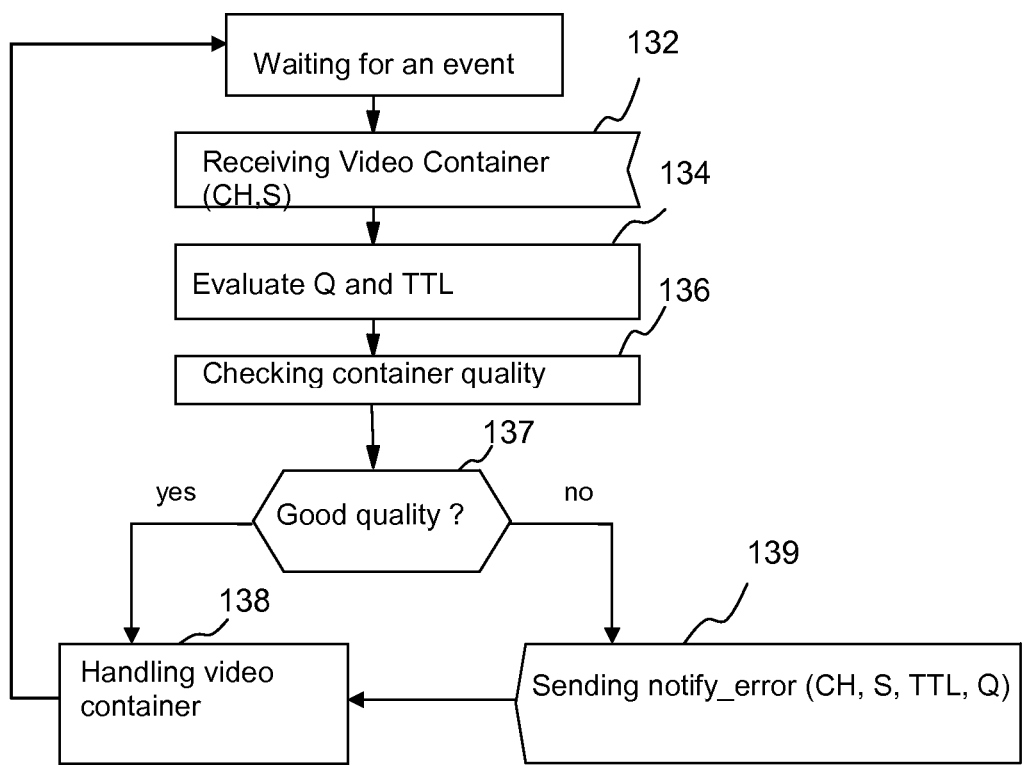
FIG. 13 is a flowchart illustrating the steps performed by a user device for notifying erroneous video containers to the retransmission manager.

FIG. 13 is a general flowchart illustrating the steps performed by a user device 3 for notifying a corrupted video container to the retransmission manager 8, in the particular embodiment of the invention where error notifications include the channel parameter CH, the sequence number S, the Time To Live parameter TTL et the quality indicator Q.

At step 132, the user device 3 receives a video container identified by a sequence number S through a channel CH.

At step 134, the user device 3 then evaluates the quality indicator Q, for example as described with reference to FIG. 7, and the Time To Live parameter TTL for the received video container.

At step 136, the user device 3 checks if the video container has been received with a sufficient quality level using the quality indicator Q, for example as described with reference to FIG. 7.

If the video container quality is satisfying, the user device 3 processes the video container without sending any notification to the retransmission manager 8, at step 138.

If the video container quality is not satisfying, then the user device 3 sends an error notification "Notify_Error" including the channel information CH, the sequence Number information S, the TTL parameter and the Quality indicator Q, at step 139. The user device 3 will also process the video container at step 138.

Figure 14:
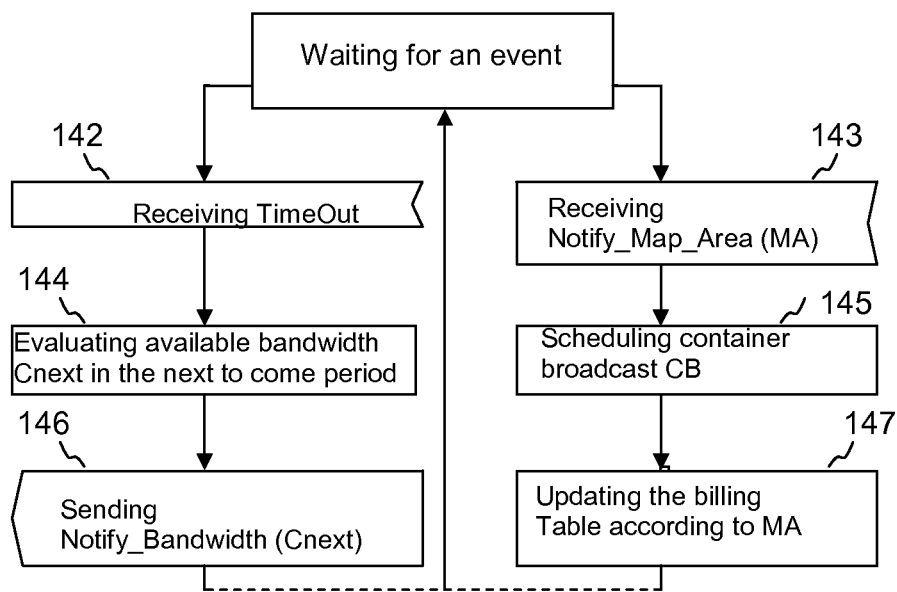
FIG. 14 is a flowchart illustrating the steps performed by a broadcasting unit for notifying available bandwidth.

FIG. 14 illustrates the steps performed by the broadcasting unit 2 for notifying bandwidth information to the retransmission manager 8 and for retransmitting video containers.

At step 142, the broadcasting unit 2 receives timeout information for periodically notifying the bandwidth information C, according to a period p2.

At step 144, the broadcasting unit 2 then evaluates the available bandwidth Cnext corresponding to the next period p2.

At step 146, the broadcasting unit 2 then sends a bandwidth notification "Notify_Bandwidth" to the retransmission manager 8 to notify the available bandwidth Cnext.

The broadcasting unit 2 may further receive a retransmission request "Notify_Map_Area" from the retransmission manager 8, at step 143. The retransmission request includes the MA 87 identifying a number of selected video containers. Each entry of the MA 87 associates a channel identifier CH with a sequence number S and a negotiation parameter F.

At step 145, the broadcasting unit 2 schedules the broadcasting of the video containers identified in the retransmission request and will rebroadcast the selected video containers as scheduled.

At step 147, the broadcasting unit 2 updates a billing table according to the negotiation parameter values F contained in MA 87, whereby the broadcaster will be able to address a bill to the content providers 7 that proposed the negotiation parameters F.

Figure 15:
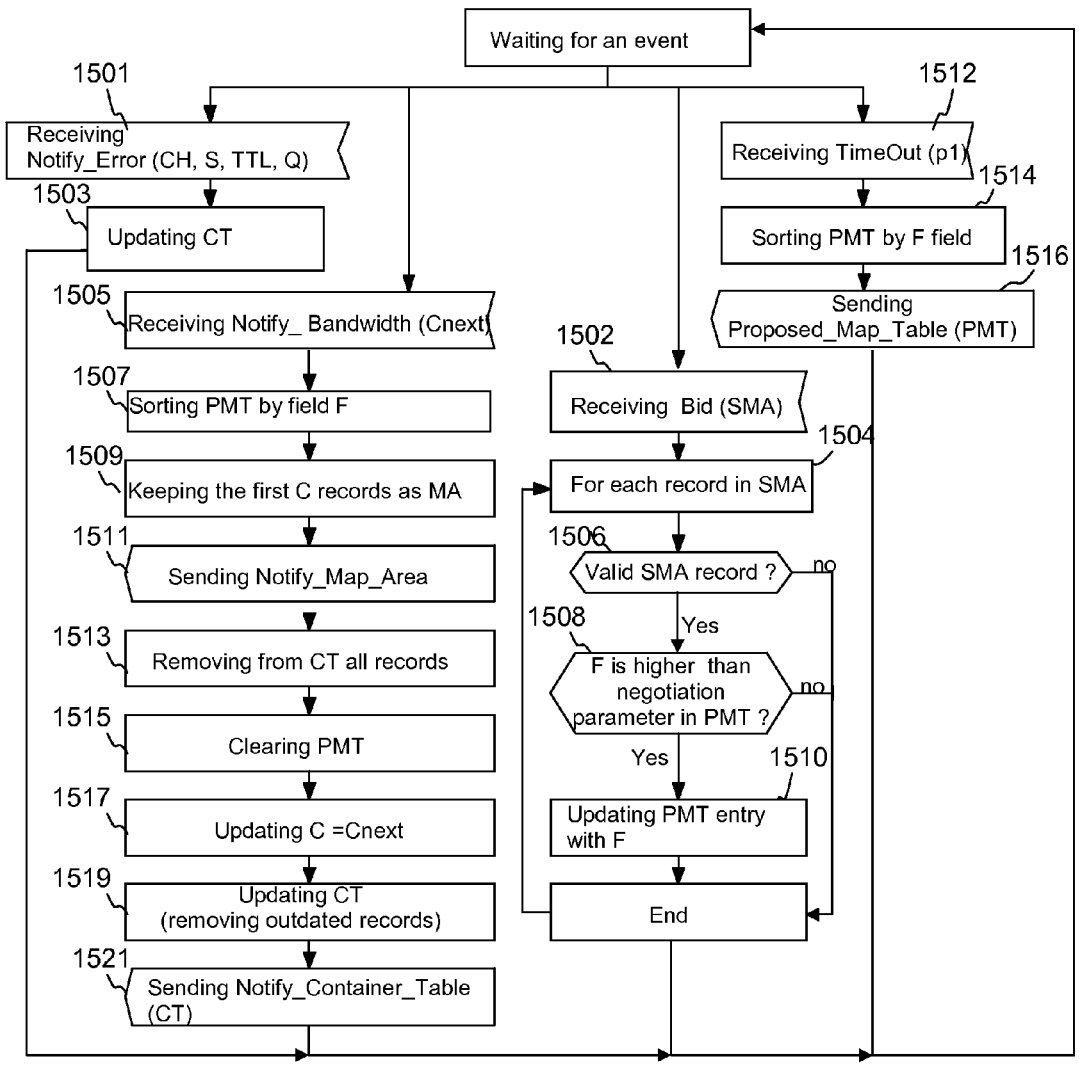
FIG. 15 is a diagram illustrating the steps performed by the retransmission manager for managing bandwidth negotiation.

FIG. 15 illustrates the steps performed by the retransmission manager 8 to initiate and manage a negotiation session.

At step 1501, the retransmission manager receives an error notification "Notify_Error (CH, S, TTL, Q)" from a given user device 3. The error notification contains the channel identifier CH identifying the channel through which the video container has been received by the user device, the sequence number S identifying the video container, the Time To Live parameter TTL evaluated for the video container, and the quality indicator Q related to the quality of the video container.

At step 1503, the retransmission manager adds in the container table 80 a new entry for the notified video container. The new entry includes the information CH, S, TTL, and Q. The retransmission manager proceeds in the same way all the notifications received from the user devices.

Steps 1505 to 1521 relate to exchanges between the retransmission manager and the broadcasting unit 2.

More specifically, when the retransmission manager 8 receives a bandwidth notification "Notify_Bandwidth (Cnext)" from the broadcasting unit 2 containing information Cnext indicating the available bandwidth for the next time period, at step 1505, the retransmission manager 8 selects a number of video containers among the video containers that are candidate for retransmission, based on the negotiation information received from the content providers and on the available bandwidth C in the current period. According to one embodiment of the invention, this includes sorting the PMT 86 by negotiation field F, at step 1507. The PMT 86 maintains negotiation information in association with respective video containers, as a result of negotiation messages received from the content providers 7. The PMT 86 also stores the available bandwidth C for the current period as shown in FIG. 12.

Then, at step 1509, the retransmission manager 8 selects the C first records from the PMT 86 and stores them in the MA 87. Accordingly, whereas the PMT 86 stores the information related to video containers for which negotiation messages have been received from the content providers, the MA 87 only contains the C first video containers among the PMT video containers having the higher negotiation parameter F. The MA 87 represents the selected video containers that are to be retransmitted.

At step 1511, the retransmission manager then sends a retransmission request "Notify_Map_Area" including the MA 87 to the broadcasting unit 2. The broadcasting unit 2 will in turn rebroadcast the selected video containers and updates the content providers bills based on the negotiation parameter values.

At step 1513, the retransmission manager 8 removes from the container table 80 all the records that correspond to the video containers selected in the MA 87.

At step 1515, the retransmission manager also clears the PMT 86 to get ready for a new negotiation session.

At step 1517, the retransmission manager updates the bandwidth field C in the PMT 86 with the value Cnext received at step 1505.

At step 1519, the retransmission manager 8 further updates the container table 80 by removing all the outdated records based on the TTL parameter associated with each record.

At step 1521, the retransmission manager 8 sends a notification "Notify_Container_Table" including the updated container table 80 to the content providers 7 so that all the content providers may have visibility on the video containers that require retransmission and start negotiation sessions for the retransmission of these video containers.

The retransmission manager 8 is further responsible for initiating and handling a negotiation session with the content providers.

A negotiation session is started in response to the reception of a negotiation message "Bid(SMA)" from a content provider at step 1502. The negotiation message includes a Sub Map Area (SMA) table 88 which contains information related to video containers for which the content provider 7 wishes to negotiate the retransmission. It may include one or more entries each related to a particular video container and comprising a channel identifier CH, a sequence number S and negotiation parameter F for the associated video container.

At step 1504, the retransmission manager then processes each record in the Sub Map Area table 88. This includes for each record in SMA associated with a given video container, checking whether the record is valid at step 1506. If the record is valid, then the retransmission manager checks whether the negotiation parameter F associated with the record is higher than the negotiation parameter associated with the same video container in the PMT 86, at step 1508. If the negotiation parameter F is higher, then the retransmission manager 8 updates the negotiation parameter associated with the video container in the PMT 86 with the negotiation parameter F of the SMA table, at step 1510. Then, the retransmission manager processes the next record by repeating steps 1506 to 1510. If the negotiation parameter F is not determined as higher, the PMT 86 is not updated, and the retransmission manager repeats steps 1506 to 1510 for the next record in SMA.

Further, according to the invention, all the content providers 7 may have a visibility on the state of the current negotiation session. More specifically, when at step 1512, the retransmission manager receives timeout information p2, it sorts the PMT 86 by negotiation parameter F, at step 1514, and sends at step 1516 the PMT 86 thus updated to the content providers 7. Accordingly, all the content providers are informed of the negotiation session state, and in particular on the negotiation parameter values F proposed by other content providers 7, so that they may accordingly send a negotiation message to overbid.

With the invention, content providers can negotiate the video containers that are to be retransmitted, in accordance with the available bandwidth at the broadcasting unit level.

With the invention, the end users can thus receive digital content on their user equipment with an improved quality.

The detection of corrupted video containers and the retransmission of selected video containers occur within the buffering duration. Accordingly, the invention does not generate further delay and the end users can receive the video sequence with a satisfying level of quality and in a transparent manner.

According to the invention, it is also possible to manage retransmission of corrupted video containers taking into account broadcasting conditions (available bandwidth), and negotiation information (fee parameters).

The invention can further take the form of an entirely hardware embodiment, an entirely software embodiment or an embodiment containing both hardware and software elements implementing the system and the method according to the invention.

The invention can also take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, the skilled person will understand that the structures of the container table 80, the PMT 86, the MA Table 87, or the Sub Map area Table 88 are for exemplary purposes only, and that other structures could be used alternatively, with additional parameters.

The invention claimed is:

1. A retransmission manager for a digital content delivery system, the digital content delivery system comprising:
a plurality of user devices,
a set of content providers for delivering digital content to the user devices in bursts of content, through a source unit,
wherein the retransmission manager is connected to the user devices to receive notifications therefrom, each notification received from a given user device identifying a burst received by the given user device which is a candidate for retransmission, and wherein each notification identifying a given burst further includes a time to live parameter related to the given burst and indicating a time limit up to which the burst can be retransmitted before being discarded,
wherein the retransmission manager selects a set of bursts among the bursts identified by the notifications based on an amount of available bandwidth at the source unit on negotiation messages received from at least one of the plurality of content providers, the negotiation message being related to at least one burst identified in the notifications and including, for each burst, a negotiation parameter; and
the retransmission manager sends a request for retransmission of the selected bursts to the source unit.

2. The retransmission manager of claim 1, wherein the retransmission manager comprises at least one management table for maintaining information related to the notifications received from the user devices.

3. The retransmission manager of claim 2, wherein the retransmission manager removes all entries from the at least one management table that correspond to the selected bursts, after sending a request for retransmission to the source unit.

4. The retransmission manager of claim 2, wherein the retransmission manager notifies the content providers of the at least one management table.

5. The retransmission manager of claim 2, wherein each entry of the management table is related to a burst identified by one of the notifications, and includes information provided in the notification.

6. The retransmission manager of claim 1, wherein each notification identifying a given burst includes a channel identifier identifying a transmission channel of the given burst, a sequence number identifying the given burst, and a quality indicator related to a quality of the burst.

7. The retransmission manager of claim 6, wherein the quality indicator is a parameter related to subjective quality as perceived by a user.

8. The retransmission manager of claim 7, wherein the quality indicator is a mean opinion score (MOS) parameter.

9. The retransmission manager of claim 8, wherein the MOS parameter is a quality of experience (QoE) parameter.

10. The retransmission manager of claim 1, wherein the negotiation message further includes for each burst, a channel identifier identifying a transmission channel of the given burst, and a sequence number identifying the given burst.

11. The retransmission manager of claim 1, wherein the retransmission manager further comprises a negotiation table for storing the negotiation message related to a given burst, each entry of the negotiation table being related to a given burst and including the negotiation parameter of the negotiation message.

12. The retransmission manager of claim 11, wherein the retransmission manager creates a new entry for each burst identified in a negotiation message received from a given content provider, if the negotiation parameter associated with the burst matches a condition related to the negotiation parameter values stored in the negotiation table.

13. The retransmission manager of claim 12, wherein the retransmission manager notifies the set of content providers of the negotiation table, at a predefined time interval.

14. The retransmission manager of claim 12, wherein the retransmission manager selects the bursts identified in the negotiation table which are associated with a higher negotiation parameter values and match the amount of available bandwidth, as the set of selected bursts.

15. The retransmission manager of claim 1, wherein the retransmission manager sorts the negotiation table out of order by negotiation parameter field, for each new selection.

16. The retransmission manager of claim 1, wherein the retransmission manager makes a new selection, in response to a reception of a notification from the source unit containing information related to the amount of available bandwidth at the source unit.

17. The retransmission manager of claim 1, wherein the user devices and the source unit are of a DVB-H (Digital Video Broadcast-Handheld) type.

18. The retransmission manager of claim 1, wherein the user devices are of a mobile phone type and are connected to the retransmission manager through radio communication.

19. The retransmission manager of claim 18, wherein the radio communication comprises GPRS (General Packet Radio Service) or UMTS (Universal Mobile Telecommunications System).

20. A system for delivering digital content to a user device, the system comprising:
   a plurality of user devices,
   a source unit connected through a communication network to the user devices for delivering digital content to the user devices in bursts of content, and
   a retransmission manager, wherein the retransmission manager is connected to the user devices to receive notifications therefrom, each notification received from a given user device identifying a burst received by the given user device which is a candidate for retransmission, and wherein each notification identifying a given burst further includes a time to live parameter related to the given burst and indicating a time limit up to which the burst can be retransmitted before being discarded,
   wherein the retransmission manager is configured to:
   select a set of bursts among the bursts identified by the notifications based on an amount of available bandwidth at the source unit and on negotiation messages received from at least one of the plurality of content providers, the negotiation message being related to at least one burst identified in the notifications and including, for each burst, a negotiation parameter; and
   send a request for retransmission of the selected bursts to the source unit.

21. A method of managing retransmission of bursts of digital content delivered to a plurality of user devices by a set of content providers through a source unit, comprising:
   receiving notifications from the user devices, each notification received from a given user device identifying a burst received by the given user device which is a candidate for retransmission, and wherein each notification identifying a burst further includes a time to live parameter related to the burst and indicating a time limit up to which the burst can be retransmitted before being discarded;
   storing information related to each received notification in at least one management table;
   selecting a set of bursts among the bursts identified by the notifications based on an amount of available bandwidth at the source unit and on negotiation messages received from at least one of the content providers, the negotiation message being related to at least one burst identified in the notifications and including, for each burst, a negotiation parameter; and
   sending a request for retransmission of the selected bursts to the source unit.

* * * * *